May 19, 1964

P. HARTMANN 3,133,617

HYDRAULIC VARIABLE SPEED DRIVE

Filed Aug. 28, 1961

*INVENTOR:*
PHILIP HARTMANN
BY: *Arthur J. Hansmann*
*ATTORNEY*

May 19, 1964     P. HARTMANN     3,133,617

HYDRAULIC VARIABLE SPEED DRIVE

Filed Aug. 28, 1961     2 Sheets-Sheet 2

INVENTOR:
PHILIP HARTMANN

BY: *Arthur J. Hausmann*
ATTORNEY

United States Patent Office 3,133,617
Patented May 19, 1964

3,133,617
HYDRAULIC VARIABLE SPEED DRIVE
Philip Hartmann, Racine, Wis., assignor to Hartmann Manufacturing Company, Racine, Wis., a corporation of Wisconsin
Filed Aug. 28, 1961, Ser. No. 134,245
8 Claims. (Cl. 192—58)

This invention relates to a hydraulic variable speed drive or transmission and more especially it relates to a hydraulic transmission which receives an input drive at one speed and which transmits the drive to an output shaft at a different and selectable speed.

It is accordingly an object of this invention to provide an improved hydraulic transmission which receives the input drive at one speed and transmits the drive through the transmisison and therefrom at a different and selectable speed.

Another object of this invention is to provide a hydraulic transmission for conveying or transmitting a power drive at selectable or variable speeds, and wherein the transmisison is controllable through a complete range of speeds and it is inexpensive but yet efficient and reliable in its construction and operation.

Another object of this invention is to provide a hydraulic variable speed drive which is simple to control through an entire range of selectable speeds and which is also smooth in operation and fully responsive to speed changes.

A more specific object of this invention is to provide a hydraulic transmission wherein all bearing loads, part stresses, and pressures are balanced so that no internal forces are created by the hydraulic pressures, and thus, efficiency is a maximum, wear is a minimum, and bearings need not be large compared to the hydraulic pressures involved.

Still another specific object is to provide a hydraulic transmission wherein internal friction is a minimum and thus the input shaft can rotate at a high speed without inducing rotation of the output shaft, and this is accomplished in providing a power input rotor which is self-contained and in the present instance it includes the input shaft with sliding vanes and attached side plates for confining the vanes. This is a distinct improvement over my U.S. Patent No. 2,679,306.

Other objects and advantages will become apparent upon reading the following description in light of the accompanying drawings wherein.

The same reference numerals refer to the same parts throughout the several views.

Figure 1:
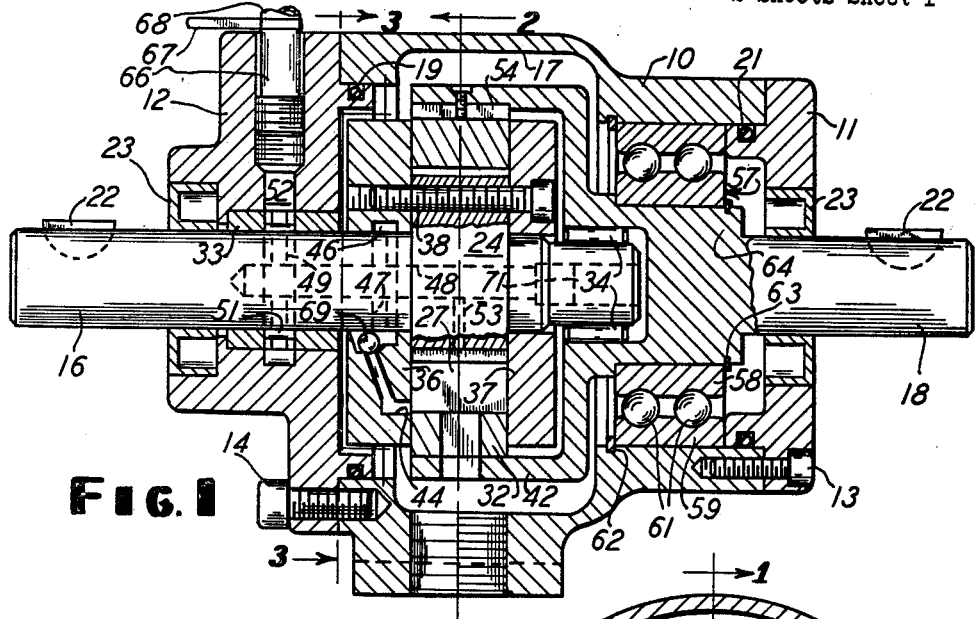
FIG. 1 is a longitudinal sectional view of one embodiment of this invention and being taken substantially on the line 1—1 of FIG. 2.

The drawings show the hydraulic unit or transmission to consist of a housing body portion 10 having an end cap 11 and another end cap 12, both of which are fluid-tightly bolted to the portion 10 by means of the bolts shown, such as the bolt 13 and bolt 14. An input shaft 16 extends through the end plate or cap 12 and into the interior 17 of the portion 10, and another shaft which is the output shaft 18 also extends into the transmission and this extends through the end plate or cap 11 as shown. It will thus of course be understood that the members 10, 11, and 12 are fluid-tightly joined together and they are sealed together by means of O-rings 19 and 21, and they present the fluid-tight interiors shown, such as the interior 17 much in the nature of a fluid pump or motor. Also keys 22 are shown on both of the shafts 16 and 18 for the purpose of connecting input and output drives thereto. Further, fluid seals 23 are shown at both ends of the unit and surrounding the respective shafts 16 and 18 to be fluid-tight therewith.

Figure 2:
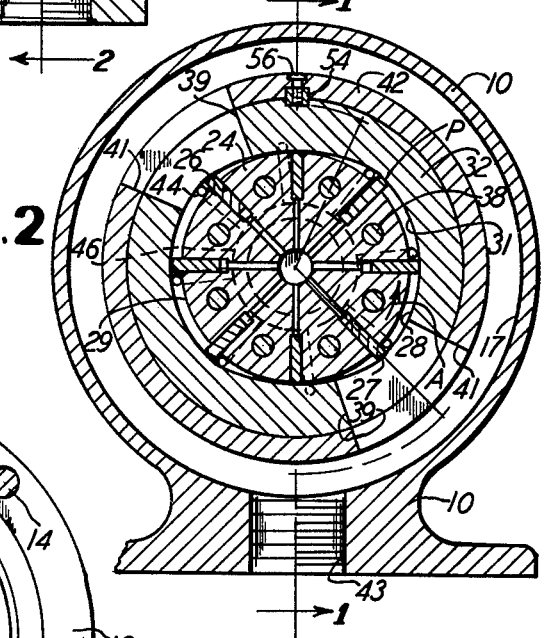
FIG. 2 is a sectional view taken on the line 2—2 of FIG. 1.
Figure 3:
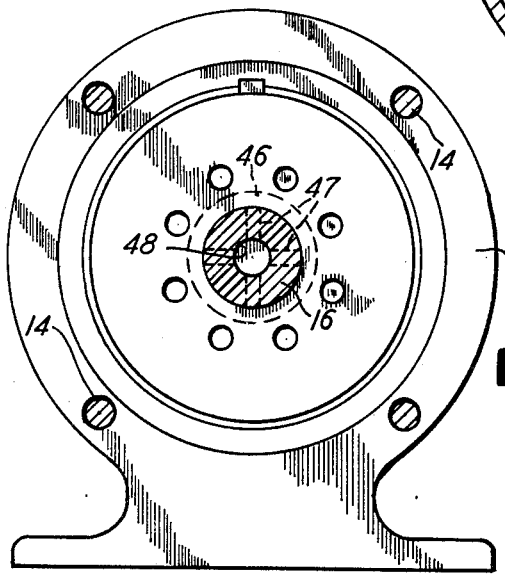
FIG. 3 is a sectional view taken on the irregular line 3—3 of FIG. 1.

It will be further understood that the input shaft 16 supports a vane type of rotor 24 which has radial slots 26 extending therein for radially, slidingly supporting vanes 27 extending through the length of the rotor portion 24. This is therefore the construction of a vane type of fluid pump or motor and it will therefore be understood that upon impressing a rotational drive to the shaft 16, the rotor 24 is rotated and the vanes 27 engage the fluid in the working chamber designated 28 and defined by the circumference 29 of the rotor 24 at the inner circumference 31 of the port ring 32 which surrounds the rotor 24. It will of course be seen that the surface or circumference 31 of the port ring 32 is shown at its top and bottom in FIG. 2 to be of a diminished radial dimension from the axis of the rotor 24 and this of course provides for the desired function of the rotor when the latter is rotated in the direction of the arrow designated "A" in FIG. 2.

Sleeve bearing 33 is disposed in the end plate 12 for rotatably supporting the shaft 16 and roller bearings or the like 34 are disposed at the opposite end of the shaft 16 on the interior of the unit for rotatably supporting the entire rotor with respect to the remainder of the unit except of course for a port plate 36 and a port plate 37 which are secured to the rotor 24 and are made a part thereof by means of the bolts 38.

Thus the rotor 24 including the port plates 36 and 37 rotate together and the vanes 27 are free to slide radially between the plates 36 and 37 as they constantly extend to the inner circumference 31 of the ring 32.

It will be further noted that the ring 32 has two inlet openings 39 and these openings are in communication with the chamber 17 by means of an opening 41 provided in a driven member or ring 42 which surrounds the port ring 32. Also, an inlet opening 43 is provided in the housing 10 and thus fluid entering the inlet 43 will of course flow into the chamber 17 and through the openings 41 and 39 and into the working chamber 28. The vanes or blades 27 then engage the fluid as the rotor 24 is rotated and the fluid is urged out of the working chamber and through the port holes or outlets 44 provided in the port plate 36. Further, an annular recess 46 is provided in the port plate 36 and is in communication with the port openings 44 to receive the fluid therefrom and in turn, radial openings 47 communicate between the recess 46 and the axial opening 48 in the rotor and shaft 16, as shown. The fluid is thus directed through the axial opening 48 and to additional radial openings or passageways 49 which in turn communicate with an annular recess 51 provided in the sleeve bearing 33 and the recess 51 in turn communicates with the outlet opening 52 in the end cap 12.

It will thus be seen that the fluid flows through the transmission along the path described as the rotor is rotated, and it will also be understood that the vanes 27 are urged radially outwardly against the circumference 31 by any conventional means and in the present instance, radial openings or passageways 53 are shown to extend from the axial opening 48 to the base of the slots 26 in the rotor 24 and thus fluid pressure can be exerted on the radially inner edges of the vanes 27 and urge the vanes outwardly, and they are also of course urged outwardly by means of centrifugal force as the rotor 24 is rotated.

Referring again to the reactor or driven ring 42, it will be noted that the port ring 32 and the ring 42 are keyed together by means of the key 54, which is retained by the bolt 56 and thus the rotational relation between the ring 32 and 42 is retained. It will be further noted that the ring 42 is rotatably mounted in the unit by means of the bearing 57 which is shown to be of a double roll ball bearing type of bearing having of course the inner race 58 and the outer race 59 and the balls 61. The usual type of snap ring 62 and snap ring 63 are shown to secure the ball bearings 57 in the axially shown position on the hub 64 of the reactor or ring 42. Also, it will be seen that the output shaft 18 is shown as an extension of the hub 64 and therefore the ring 42 so that they all rotate together as the output member of the entire unit.

A fluid control valve designated 66 is shown mounted in the outlet 52 of the unit and a control handle 67 is attached thereto so that the valve designated 66 will control the quantity of fluid flowing therethrough and therefore the quantity of fluid flowing through the outlet 52 or out of the unit. It will be further understood that the valve 66 has its outlet 68 which can be directed to a sump or reservoir (not shown) or it can of course be connected to the inlet 43 so that a complete closed circuit of hydraulic fluid is provided.

Also, a ball check 69 is provided in the outlet passageways and is shown to be in the outlet end of the exhaust port 44.

With the foregoing and the following description, a complete disclosure of the device is made to one skilled in the art and it will therefore be understood that rotation applied to the input shaft 16 causes the rotor 24 to rotate and bring fluid into the inlet passages and into the working chamber 28. Then, depending upon the setting of the outlet valve 66, the quantity of the working fluid flowing from the valve will be controlled and accordingly the quantity of fluid existing between the vanes 27 and the crescent-shaped openings in the working chamber 28 will be controlled so that the power applied to the rotor 24 will be transmitted to the port ring 32 in proportion to the freedom of the fluid to flow through the port openings 44 and out the outlet 52 of the unit. Thus, considering the vane 27 in the position designated "P" in FIG. 2, it will be appreciated that if the outlet valve 66 is in at least a partially closed position, the fluid existing in the rotationally leading direction with respect to the vane "P" will not be able to pass into the outlet passage, and the fluid will therefore remain in the substantially triangular vane shown in advance of the vane "P," and the fluid will therefore cause the ring 32 to rotate along with the rotation of the rotor 24 and of course in turn, the reactor 42 will rotate so that the output shaft 18 will be rotated as desired.

Thus the reactor 42 includes the port ring 32 as the two are keyed together to rotate as one and the outlet passageway for the transmission or drive includes the shaft passageway 48 which is of course blocked on one end by means of a plug 71, and further the rotor 24 consists of the main circular portion supporting the vanes 27 and it also includes the port plates 36 and 37 since they are bolted to the portion 24.

Figure 4:
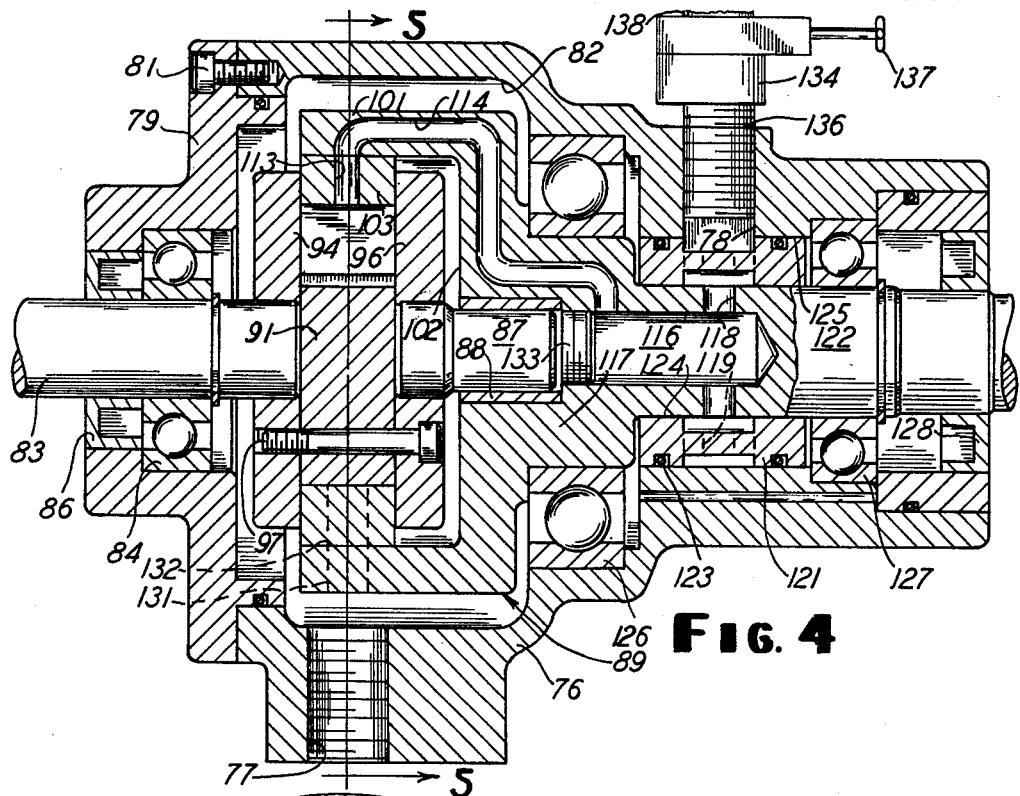
FIG. 4 is a sectional view taken on the line 4—4 of FIG. 5 and showing another embodiment of this invention.
Figure 5:
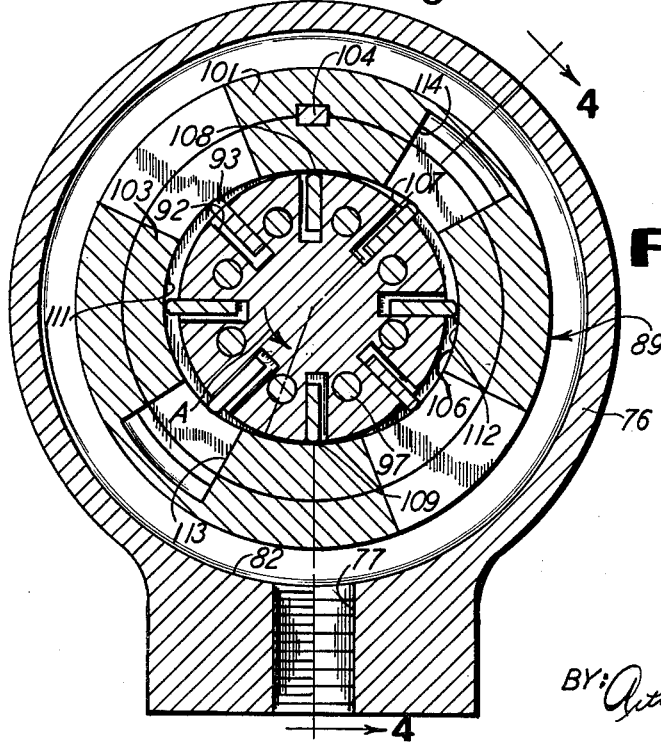
FIG. 5 is a sectional view taken on the line 5—5 of FIG. 4.

FIGS. 4 and 5 show an important embodiment of this invention and it will here be noted that there is disclosed a housing 76 having a fluid inlet 77 and a fluid outlet 78. Also an end plate or cap 79 is secured to the housing by means of bolts such as a shown bolt 81, and the housing presents an interior chamber 82 in which the operating parts are disposed. Here, an input shaft 83 is rotatably mounted in the end plate by means of the ball bearing 84 and a seal 86 is disposed around the shaft 83 and in the end plate 79 to render the construction fluid-tight at that end. The shaft 83 terminates at its inner end 87 which is rotatably mounted in the bushing 88 disposed in the reactor generally designated 89.

Thus the input shaft 83 has the rotor 91 mounted thereon, and the rotor has the conventional vane slot 92 and conventional vanes 93 disposed thereon, both in the well-known construction of a radial vane type of rotor. Also, side plates 94 and 96 are disposed on opposite sides of the rotor body 91 and are secured thereto by means of bolts 97 extending between the plate and through the rotor as shown. Thus it will of course be understood that the input shaft 83 is rotatably mounted and carries the rotor body 91 and the sides plates 94 and 96 along with the rotor vanes 93 which all form the input shaft and rotor of the embodiment shown.

The reactor 89 is thus shown to enclose at least a part of the input shaft and rotor described in that the reactor includes the hollow and arcuately-shaped portion 101 which has a hollow interior 102 wherein the rotor parts are actually disposed. Also, a reactor ring 103 is secured to the reactor part 101 by means of a key 104 so that the part 101 and ring 103 rotate together as one piece as indicated by the sectioning thereon in FIGS. 4 and 5. Ring 103 has an internal arcuate surface 106 which defines a part of the working chamber of the transmission, and which contacts the outer circumference 107 of the rotor at the two diametrically opposite locations 108 and 109. Two other diametrically opposite portions 111 and 112 on the ring surface 106 are thus spaced from the circumference 107 of the rotor and they therefore locate the working chambers on the diametrically opposite sides of the rotor as clearly shown in FIG. 5. Of course by this means of providing two diametrically opposite working chambers, the transmission is in radial fluid pressure balance as there is no one working chamber receiving the fluid under pressure to cause the fluid to force the rotor in a radial direction.

The reactor 89 also includes a pair of fluid passageways for the outlet of the fluid from the working chambers and these passageways consist of a first passageway 113 in the ring 103 and this communicates with the passageway 114 in the reactor part 101. At this time it will also be noted that the latter passageway 114 extends to a passageway 116 provided in the hub 117 of the reactor 89 and still another passageway 118 in the reactor communicates with the passageway 116 and thus guides the outlet fluid to the outlet 78 through spaced openings 119 in a ring 121 disposed around the output shaft 122 which is an extension of the reactor hub 117 as shown. O-rings 123 flank the outlet passages 119 to make the member 121 fluid tight with the housing 76 and of course the inner diameter 124 of the member 121 can be fitted onto the output shaft 122 to make it fluid tight at that point.

It will also be noted that bearings 126 and 127 are respectively disposed on the hub 117 and the shaft 122 to adequately rotatably mount the reactor 89. Further, a fluid seal 128 is disposed between the shaft 122 and the end of the housing 76 to make the unit fluid tight at that point.

In referring to FIG. 5, it will therefore be noted that two fluid outlets consisting of the various passages described, are included in the reactor 89 as dual passages 113, and 114 are provided on diametrically opposite sides of the reactor 89 to be in fluid flow communication with the central passage 116 and this therefore also fluid balances the rotor which will thus be rotating in the direction shown by the arrow designated A in FIG. 5.

The fluid inlet passage is comprised of a first passageway 131 extending through the reactor part 101 and this passageway is in communication with the passageway 132 in the reactor ring 103. Referring to FIG. 5, it will therefore be noted that the inlet 77 opens to the interior 82 which of course is in communication with the diametrically opposite passages 131 and 132 provided in the reactor 89 and these of course lead into the working chambers described.

It will further be noted that a plug 133 is provided in the end of the passageway 116 so that the outlet passage is confined to the flow from the working chamber to the housing outlet 78 as obviously desired.

Here it will also be noted that a flow control valve 134 is connected by means of the connection 136 to the outlet 78 and a control handle 137 governs the fluid flow through the valve outlet designated 138. Thus again the means are provided for controlling the flow of fluid through the transmission so that the power impressed to rotate the input shaft 83 is directed against the fluid existing in the transmission interior 82 and of course the reactor 89 responds in rotation according to the amount of pressure which can be applied on the working fluid and this pressure is determined by the torque on the shafts 83 and 122. Thus, if the valve 134 is placed in a closed position, then the flowage of the fluid is small and the transmission between the input 83 and the reactor 89 may be on a one to one basis so that there is a direct drive between the two and conversely if the valve 134 is opened so that the flowage is increased in the working chambers, then the rotation of the reactor 89 will correspondingly be reduced as desired.

In both of the embodiments shown, it will thus be understood that a balanced transmission is provided such that the hydraulic pressure does not create a force either radially or axially on the moving parts and this is true since dual diametrically oppositely disposed working chambers are provided and the outlets of the fluid are axially as well as radially balanced so there is no force created which is not balanced. Also, with the provision of attaching the side plates in their respective embodiments to the rotors so that the vanes are overlapped by the side plates, the entire input unit with the shaft and rotor and side plates rotate as one and there is therefore only a minimum of internal friction and there is no problem of creating sealing of the fluid since simply bolting the side plates to the rotor provides the necessary fluid sealing and the only frictional drag between the input and the output units is that which would be created by the outer edges of the side plates sliding over the corresponding side of the respective port rings 32 and 103 and of course whatever friction may be created by the radially outer tips of the respective vanes sliding the port rings 32 and 103. However, this friction is of a minimum compared to the friction created in other structures which has utilized for hydraulic transmission purposes.

Referring again to the sleeve 121, it will be seen that the fit of the internal diameter 124 is a running fit with the shaft 122 since the latter rotates in sleeve 121, but the fit is a fluid-tight one on both sides of outlets 119. Also, provision of the two O-rings 123 makes the sleeve 121 self-aligning with the bore 125 in the housing 76. Such arrangement permits simplified manufacture of the pump without requiring difficult concentricity of the sleeve 121 and the shaft 122 and the bore 125.

While two specific embodiments of this invention have been shown and described, it will be understood that certain changes could be made therein and the invention therefore should be limited only by the scope of the appended claims.

What is claimed is:

1. A manually controllable variable speed hydraulic drive comprising a housing having a fluid inlet opening and a fluid outlet opening and a chamber defined therein, a vane type of rotor rotatably disposed in said chamber and including sliding vanes, an input shaft connected to said rotor and extending into said housing and having a bore therein in fluid-flow communication with said fluid outlet opening, a ring rotatably disposed in said chamber and having an inner arcuate surface encircling said rotor and being in fluid-snug contact therewith on a part of said surface and being spaced from said rotor at another part of said surface to define a working chamber with said rotor in the path of said vanes, plates attached to opposite sides of said rotor to rotate therewith and extending beyond the circumference of said rotor and with one of said plates having fluid passages in rotationally forward positions from said vanes and in flow communication with said working chamber and said bore, said rotor and said ring and said plates all being radially spaced from said housing, said ring having a fluid passage in fluid-flow communication with both said fluid inlet opening and said working chamber, an output shaft rotatably mounted in said housing and connected to said ring and extending exteriorly of said housing, and a manually controllable hydraulic valve disposed in said outlet opening in the path of the outlet flow from said housing for regulating the quantity of hydraulic fluid flowing through said working chamber and thereby regulating the speed of rotation of said output shaft.

2. A variable speed hydraulic drive comprising a housing having a fluid inlet opening and a fluid outlet opening and a chamber defined therein, a vane type of rotor rotatably disposed in said chamber and including sliding vanes, a first shaft connected to said rotor and extending exteriorly of said housing, a ring rotatably disposed in said chamber and having an inner arcuate surface encircling said rotor and being in fluid-snug contact therewith on a part of said surface and being spaced from said rotor at another part of said surface to define a working chamber with said rotor in the path of said vanes and being of a width equal to that of said rotor, said ring having a first fluid passage in fluid-flow communication with both said fluid inlet opening and said working chamber and having a second fluid passage in fluid flow communication with both said working chamber and said fluid outlet opening, a plate connected to each side of said rotor and extending radially therebeyond to overlap said ring and present a fluid-tight seal therewith, said ring being radially spaced from said housing, a second shaft connected to said ring and extending through said housing, and a hydraulic valve disposed in said outlet opening in the path of the outlet flow from said housing for regulating the quantity of hydraulic fluid flowing through said working chamber and thereby regulating the speed of rotation of said output shaft.

3. A variable speed hydraulic drive comprising a housing having a fluid inlet opening and a fluid outlet opening and a chamber defined therein, a vane type of rotor rotatably disposed in said chamber and including sliding vanes, an input shaft connected to said rotor and extending through said housing, a ring rotatably disposed in said chamber and having an inner arcuate surface encircling said rotor and being in fluid-snug contact therewith on two diametrically opposite parts of said surface and being spaced from said rotor at the two intervening diametrically opposite parts of said surface to define two working chambers with said rotor in the path of said vanes, one of said ring and said rotor having fluid passages in fluid-flow communication with both said working chambers and said fluid outlet opening, the other of said ring and said rotor having fluid passages in fluid-flow communication with both said fluid inlet opening and said working chambers, an output shaft connected to said ring and extending exteriorly of said housing, a hydraulic valve disposed in the path of the outlet flow from said housing, and control means connected to said valve and disposed exteriorly of said housing for regulating the quantity of hydraulic fluid flowing through said working chambers and thereby regulating the speed of rotation of said output shaft.

4. A variable speed drive for receiving an input drive at a constant speed and producing an output drive at any selected speed less than said constant speed, comprising a housing having a fluid inlet opening and a fluid outlet opening therein, a rotor and a reactor both rotatably disposed in said housing and defining two diametrically oppositely disposed working chambers therebetween for the flow of fluid therethrough, an input shaft on said rotor, said reactor having two diametrically oppositely disposed fluid inlet passages in fluid-flow communication with both said fluid inlet opening and said working chamber and having two diametrically oppositely disposed fluid outlet passages in fluid-flow communication with said working chambers, an output shaft connected to said reactor and having a fluid outlet passageway in fluid-flow communication with said fluid outlet passages and said fluid outlet opening, fluid engaging means on said rotor and extending into said working chamber for pumping fluid through said housing, a fluid control valve operable on said fluid outlet opening, and control means connected to said valve and disposed exteriorly of said housing for regulating the quantity of fluid flowing through said working chamber and thereby regulating the rotational speed of said reactor.

5. A variable speed hydraulic drive comprising a housing having a fluid inlet opening and a fluid outlet opening and a chamber defined therein, a vane type of rotor rotatably disposed in said chamber and including sliding vanes, a first shaft connected to said rotor and extending exteriorly of said housing and having a bore therein in fluid-flow communication with said fluid outlet opening, a ring rotatably disposed in said chamber and having an inner arcuate surface encircling said rotor and being in fluid-snug contact therewith on a part of said surface and being spaced from said rotor at another part of said surface to define a working chamber with said rotor in the path of said vanes, port plates included in said rotor to rotate therewith, said plates extending radially and flanking said ring and with one of said plates being provided with fluid passages responsive to pumping action of said vanes and being in fluid-flow communication with said working chamber and said bore, said ring being radially spaced from said housing and having a radially disposed fluid passage in fluid-flow communication with both said fluid inlet opening and said working chamber, a second shaft operatively associated with said ring to rotate therewith and extending exteriorly of said housing, and a hydraulic valve disposed in the path of flow of said fluid and exteriorly of said housing for manually regulating the quantity of hydraulic fluid flowing through said working chamber.

6. In a hydraulic unit of the type including a housing having a circular bore therein and a fluid inlet and a fluid outlet and a shaft rotatably mounted in said housing and extending through said bore in radially spaced relation from the circular wall thereof and a rotor and reactor unit operatively associated with said shaft for rotation therewith in said housing, the invention comprising said circular bore being disposed adjacent said fluid outlet, said shaft having a fluid passageway therein in fluid-flow communication with said unit, a sleeve disposed in said bore and around said shaft in the radial space therebetween and being fluid tight with said shaft and having a running fit therewith for rotation of said shaft in said sleeve, said sleeve having a fluid opening in fluid-flow communication with said fluid passageway and said fluid outlet, and pliable fluid sealing means disposed between said sleeve and said circular wall on both sides of said fluid opening.

7. A variable speed hydraulic drive comprising a housing having a fluid inlet opening and a fluid outlet opening and a chamber defined therein, a hydraulic pump rotatably disposed in said chamber and having a fluid discharge opening, an input shaft connected to said pump and extending exteriorly of said housing and having a bore in fluid-flow communication with said fluid discharge opening of said pump and with said bore being in fluid-flow communication with said fluid outlet opening, said pump including a port ring disposed in said chamber and having a fluid inlet passage in fluid-flow communication with said fluid inlet opening and being radially spaced from said housing, an output shaft connected to said ring and extending exteriorly of said housing, said port ring and said output shaft being rotatably mounted in said housing, and a hydraulic valve disposed in the path of the outlet flow from said housing for regulating the quantity of hydraulic fluid flowing through said working chamber and thereby regulating the speed of rotation of said output shaft.

8. A hydraulic unit comprising a housing having a circular bore therein and a fluid inlet and fluid outlet and a chamber with a rotor and a reactor unit rotatable therein, a shaft rotatably mounted in said housing and extending through said bore in radially spaced relation from the circular wall thereof and attached to said unit for rotation therewith in said housing, said shaft having a fluid passageway therein, said unit having an outlet passage extending therethrough to said fluid passageway, a sleeve disposed in said bore and around said shaft in the radial space therebetween and having a fluid opening in communication with said fluid passageway and said fluid outlet, O-rings disposed in said circular bore around said sleeve on opposite sides of said fluid opening for fluid sealing between said sleeve and said circular wall, and bearings disposed in said housing on opposite sides of said sleeve and on said shaft for rotatably supporting the latter.

References Cited in the file of this patent
UNITED STATES PATENTS

| | | |
|---|---|---|
| 1,317,415 | Baker et al. | Sept. 30, 1919 |
| 1,828,861 | De Hart | Oct. 27, 1931 |
| 2,145,894 | Rusch | Feb. 7, 1939 |
| 2,146,717 | Berger | Feb. 14, 1939 |
| 2,242,734 | Whittlesey | May 20, 1941 |
| 2,581,172 | Carson | June 1, 1952 |
| 2,679,306 | Hartmann | May 25, 1954 |